Figure 1:
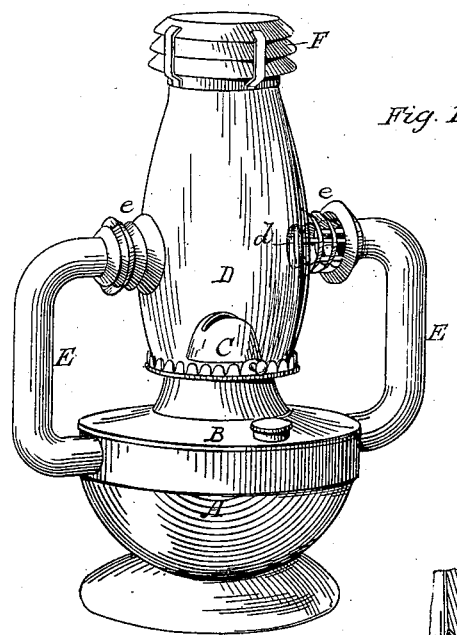

J. H. IRWIN.
Lamp.

No. 212,470.    Patented Feb. 18, 1879.

Attest:
Clarence Poole
A. B. Smith

Inventor:
John H. Irwin

United States Patent Office.

JOHN H. IRWIN, OF PHILADELPHIA, PENNSYLVANIA.

IMPROVEMENT IN LAMPS.

Specification forming part of Letters Patent No. 212,470, dated February 18, 1879; application filed January 17, 1879.

*To all whom it may concern:*

Be it known that I, JOHN H. IRWIN, of Philadelphia, county of Philadelphia, State of Pennsylvania, have invented a new and useful Improvement in Lamps; and that the following is a full and exact description of the same.

This invention relates to that class of lamps now known in the market as "tubular," and particularly to that kind of tubular lamp which requires a chimney to produce satisfactory combustion; and the particular object of the improvement herein described is the organization of a lamp suitable and in every way desirable for indoor and outdoor purposes, wherein the flame will be capable of withstanding the great variety of disturbing effects due to the various movements both of the lamp itself and of air-currents in the vicinity to which portable lamps are commonly subjected.

In lamps the prime effect required is the supply of fresh air to the burner under all circumstances, and this is accomplished by injections below the cone of the burner or by exhaustion at the top of the chimney.

Either of these conditions facilitates combustion, while exhaustion below the burner-cone, or injection at the top of the chimney, retards combustion and causes the development of free carbon or smoke, and sometimes total extinguishment of the flame. In practice with devices capable of securing this result with uniformity, the effects of injections below the cone and exhaustion at the top of the chimney go on simultaneously.

The principle of operation common to this and all other lamps of the tubular class is well understood—the establishment of a circuit, either actual or virtual, of the air-currents which pass through the burner—that is to say, that the ingoing currents shall be equilibrated, both as to mass and distance moved, and it is also understood that results at once the best and most uniform are secured when the two currents are enabled to communicate at some point and establish an actual circuit, so that defective operation at one side may be compensated by increased efficiency at another—that is to say, if from any peculiar circumstance the device whose particular office it is to inject air to the burner shall be of diminished efficiency, the same circumstance will be caused to increase exhaustion from the chimney. In practice this compensation with varying effect is constantly in action. This has been accomplished in devices heretofore patented to me, and I therefore do not propose to claim it broadly herein, but to limit my present improvement to an arrangement which will leave the air-supply devices detached from and independent of the chimney, so that the latter may be readily removed and replaced.

That others may fully understand this improvement, I will particularly describe it, having reference to the accompanying drawings, wherein—

Figure 3:
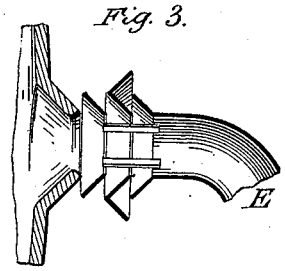
Figure 2:
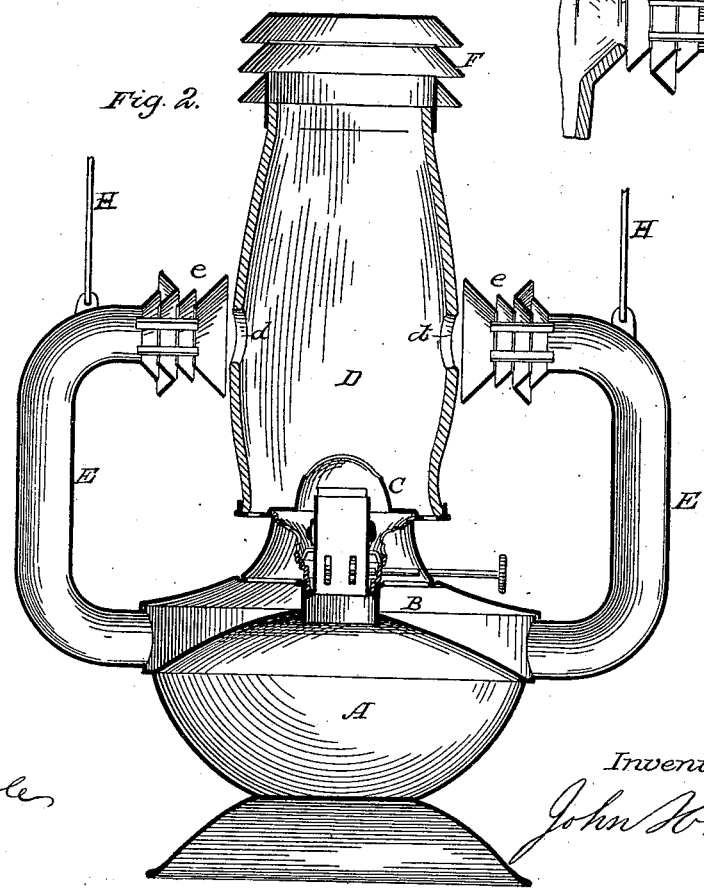

Figure 1 is a perspective view of my lamp. Fig. 2 is a sectional elevation of the same. Fig. 3 represents a modification.

A is the oil-pot, and B the air-chamber, surmounted by a burner-cone, C, as usual with lamps of this class. D is the chimney, and E E are the air-supply tubes. These tubes are terminated near to the chimney, substantially as shown, and are provided with devices $e\ e$, which act as injectors as to the outside air and ejectors as to the air within the chimney, though I do not propose to limit myself to the number or precise form of the plates forming said device, as shown in the drawings. Opposite the open ends of the tubes E E are holes $d\ d$ in the sides of the chimney. At the top of the chimney an ejector, F, of any approved pattern, may be placed, so that wind or air currents caused by motion of the lamp through the air will pass over the top of the chimney with a uniform direction, and therefore with a uniform effect of exhaustion. The cap F may be secured in place by any convenient device.

The atmospheric disturbance most difficult for a lamp of this kind to endure is the reversal of currents or exhaustion due to sudden lulls or changes of direction, which for an instant cause a great diminution of pressure and a proportionate reactionary expansion of the air within the air-spaces of the lamp if not guarded. The air within the tubes is thereby for an instant caused to flow away from the burner, and the flame is caused to smoke or is extinguished.

The required guard is found in a communication with the air within the chimney, effected in the improvement by the hole $d$, which permits the momentary exhaustion spoken of to draw from the interior of the chimney instead of from the interior of the tubes, that being the source most easily effected, because it is nearer, the air therein specifically lighter, and its direction of motion less disturbed. If the momentary exhaustion mentioned is compensated by an outflow through the holes $d$ without reversing the currents in tubes E, the burner-flame is thereby benefited, and the air-supply tubes continue their regular office of conducting air to the burner. When it is desirable to remove the chimney it may be done without disturbance of the pipes E.

In manufacturing the chimney D of glass the material around the holes $d$ may be forced outward, as shown in Fig. 3, so as to dispense with one of the inclined plates $e$. (Shown in Fig. 2.)

If desired, a bail or handle, H, may be attached to some convenient part, so that the lamp may be transported like a lantern; but ordinarily the tubes E form convenient handles.

Having described my invention, what I claim as new is—

1. In a tubular lamp, substantially as shown, the air-supply tubes E, terminated near the chimney, and provided with injecting and ejecting devices $e$, combined with a chimney, D, detached from said tubes, and having holes $d$ $d$ opposite the ends of the same, as and for the purpose set forth.

2. A lamp or lantern provided with an air-chamber, B, and burner C above the oil-pot, combined with a chimney, D, having side perforations $d$, side tubes E, terminating opposite said perforations, and an ejector-cap, F, attached to the top of said chimney, as set forth.

3. A tubular lamp or lantern, substantially as shown, provided with a chimney having perforations $d$ $d$ and an ejector-cap, F, attached to its top, combined with tubes E E, which discharge into the air-chamber B, and are armed at their open ends in front of the perforations $d$ with devices $e$, which inject fresh air from without and eject hot air from the interior of the chimney to support combustion in the burner.

4. A lamp or lantern the chimney whereof is provided at its top with an ejecting device and at its sides with orifices $d$ a little higher than the top of the burner-cone, combined with feeding-tubes, the open ends whereof are opposite said orifices, and the closed ends in communication with the air-chamber beneath the burner, for the purpose of instituting a short air-circuit.

5. The chimney D, provided with holes $d$ $d$ in its sides, and the surrounding material protruding, as set forth, combined with the feeding-tubes E, armed with deflecting-plates $e$, substantially parallel to said protruding portions of said chimney, for the purpose set forth.

JOHN H. IRWIN.

Witnesses:
LEWIS H. BETTS,
REBECCA J. ELDER.